United States Patent
Shimchik et al.

(10) Patent No.: US 12,478,895 B2
(45) Date of Patent: Nov. 25, 2025

(54) AUTOMATIC AUTOMOTIVE RACE MANAGEMENT

(71) Applicants: Constructor Technology AG, Schaffhausen (CH); Constructor Education and Research Genossenschaft, Schaffhausen (CH)

(72) Inventors: Ilya Shimchik, Zurich (CH); Maksim Filipenko, Batumi (GE); Aleksandr Buival, Bremen (DE); Ruslan Mustafin, Tbilisi (GE); Serg Bell, Singapore (SG); Stanislav Protasov, Singapore (SG); Nikolay Dobrovolskiy, Alanya (TR)

(73) Assignees: Constructor Technology AG, Schaffhausen (CH); Constructor Education and Research Genossenschaft, Schaffhausen (CH)

( * ) Notice: Subject to any disclaimer, the term of this patent is extended or adjusted under 35 U.S.C. 154(b) by 358 days.

(21) Appl. No.: 18/050,992

(22) Filed: Oct. 29, 2022

(65) Prior Publication Data
US 2024/0139645 A1 May 2, 2024

(51) Int. Cl.
*A63K 3/00* (2006.01)
(52) U.S. Cl.
CPC ....................... *A63K 3/00* (2013.01)
(58) Field of Classification Search
None
See application file for complete search history.

(56) References Cited

U.S. PATENT DOCUMENTS

| | | | | |
|---|---|---|---|---|
| 6,163,277 A * | 12/2000 | Gehlot | ............... | G08G 1/09675 340/936 |
| 10,937,252 B2 * | 3/2021 | Whitmyer, Jr. | ........... | G07C 1/24 |
| 11,113,972 B2 * | 9/2021 | Clyne | .................... | G08G 1/166 |
| 2008/0278314 A1 * | 11/2008 | Miller | .................... | G07C 5/008 340/323 R |
| 2009/0042628 A1 * | 2/2009 | Yoda | ........................ | G06T 7/74 463/6 |

(Continued)

FOREIGN PATENT DOCUMENTS

| | | |
|---|---|---|
| CN | 113592255 A | 11/2021 |
| WO | WO2021071364 A1 | 4/2021 |

OTHER PUBLICATIONS

Dave Lewandowski, "Speed trap: How series measures pit speed". Jun. 18, 2014. <https://www.indycar.com/News/2014/06/6-18-Caught-speeding-How-INDYCAR-measures-pit-speed#:~:text=According%20to%20other%20competitors%2C%20there's,is%20printed%20in%20Race%20Control>. Accessed Jul. 23, 2025 (Year: 2014).*

*Primary Examiner* — Seng H Lim
(74) *Attorney, Agent, or Firm* — ESPE Legal Consultancy FZ-LLC (57) ABSTRACT

A system and method for regulating a motorsport racing event are disclosed. The system comprises sensor modules for sensing a plurality of race parameters to generate a plurality of input signals. A data analysis module receives the input signals for analysis. A decision-making module receives the analyzed signal and computes a recommendation or a decision corresponding to the level of violation. A penalty and recommendation module receives information associated with the recommendation or the decision and presents the recommendation or the decision.

16 Claims, 4 Drawing Sheets

(56) References Cited

U.S. PATENT DOCUMENTS

| | | | |
|---|---|---|---|
| 2013/0302758 A1* | 11/2013 | Wright | H04M 1/72454 |
| | | | 701/1 |
| 2014/0300739 A1* | 10/2014 | Mimar | G06Q 30/0283 |
| | | | 348/148 |
| 2018/0341812 A1* | 11/2018 | Floor | G06V 20/42 |
| 2019/0022548 A1 | 1/2019 | Labowsky | |
| 2019/0114846 A1* | 4/2019 | Whitmyer, Jr. | G07C 1/24 |
| 2019/0311626 A1* | 10/2019 | Clyne | B62J 45/41 |
| 2020/0177969 A1* | 6/2020 | Allen | H04N 21/8126 |
| 2021/0024102 A1* | 1/2021 | Kim | A63F 13/803 |
| 2023/0158409 A1* | 5/2023 | Gardner | A63F 13/352 |
| | | | 463/6 |
| 2023/0386206 A1* | 11/2023 | Agam | G06V 20/44 |
| 2024/0404291 A1* | 12/2024 | Ward | G01S 17/89 |

\* cited by examiner

Generating a plurality of input signals, via a sensor module comprising a plurality of sensors, wherein the sensor module is configured onboard a participant race vehicle or a static or a moving object on the track for sensing a plurality of vehicle parameters during the motorsport racing event 402

Receiving the plurality of input signals, via a data analysis module for analyzing each of the plurality of input signals to identify at least one instance related to at least one vehicle parameter to determine rule violation by the participant race vehicle and generating an analyzed signal 404

Receiving the analyzed signals, via a decision-making module 406

Computing, via the decision-making module, a level of violation in response to determination of the rule violation 408

Computing, via the decision-making module, a recommendation or a decision corresponding to the level of violation 410

Receiving information associated with the recommendation or the decision, via a penalty and recommendation module, and presenting the recommendation or the decision 412

Figure 4

AUTOMATIC AUTOMOTIVE RACE MANAGEMENT

FIELD OF THE INVENTION

The present disclosure generally relates to motorsports. In particular, the present disclosure relates to a system and method for regulating a motorsport racing event.

BACKGROUND OF THE INVENTION

Automotive sports, both human-controlled and autonomous, are both fast-paced and highly regulated. Normally, several vehicles are participating in each competition. Competition events like Formula 1, Formula E, NASCAR, Indy 500, and autonomous motorsport racing events such as Roborace or Indy Autonomous have to be conducted to a comprehensive set of rules and regulations. During a race event, a group of human judges, referred to as Race Stewards, race control operators, race directors, and marshals, are responsible for enforcing these rules by monitoring the race event. It is their job to identify and interpret different situations on track, as well as to determine violations, the severity of the committed violation, and corresponding penalties. Some penalties are served during the on-track activities such as qualifications or competitions. Examples of penalties may include removal of official credit of penalty laps, removal or addition of the specified amount of time to the competitor, repositioning of competitor's vehicle during on-track activities, repositioning of an entrant on the starting grid, and disqualification.

Deciding on penalties is a critical part of racing events. However, vehicles participating in such competition events operate at high speeds and may make moves that may not be detectable by a human eye. Thus, human error in the making of penalty decisions may cause problems for the competition, and sometimes a mistake in judgment while imposing a penalty may not be easily fixed. For example, once a violation such as disallowed passing of one car by another car is detected, a group of people within a minimal amount of time need to make a decision on the existence of the penalty, its severity, and imposed violation. The stress of the situation is elevated because decisions need to be made while the race continues. In such a scenario, several factors may affect the accuracy of the decision starting with the error in human perception, error in judgment, personal bias, or stress.

There is a need for a system and a method for automotive race management that improves the accuracy of decision making without sacrificing speed. Particularly, there is a need for a system and a method for automotive race management that is automated in operation, thereby assisting in eliminating human error in making important decisions during the course of a motorsport racing event.

SUMMARY OF THE INVENTION

The present invention relates to a system and method for regulating a motorsport racing event. The system contains a sensor module comprising a plurality of sensors. The sensor module is configured onboard a participant race vehicle, on a static object, on a moving object, or in a combination of these configurations. The sensors detect vehicle parameters during the motorsport racing event and generate a plurality of input signals. The input signals correspond to vehicle parameters. A data analysis module communicates with the sensor module to receive input signals. The data analysis module is configured to analyze the input signals to identify an instance related to vehicle parameters to determine rule violations by the participant race vehicle and to generate an analyzed signal. A decision-making module communicates with the data analysis module to receive the analyzed signal. The decision-making module is configured to compute a level of violation in response to determination of rule violation and compute a recommendation or a decision corresponding to the level of violation. The recommendation and decision module communicates with the decision-making module to receive information associated with the recommendation or the decision and present the recommendation or the decision.

The plurality of input signals, the analyzed signals, the recommendation, and the decision are generated quickly enough to be useful during a racing event. The decision-making module includes a learning module to receive the analyzed signals. In some embodiments, the decision-making module is coupled to the learning module, wherein the decision-making module includes a set of rules associated with the motorsport racing event, in accordance with which the learning module computes the decision or the recommendation.

In some embodiments, the sensor module includes a telemetry module, one or more cameras, a GPS module, and a radio communication module.

In some embodiments, the decision or recommendation generated by the system includes a penalty and a pause in the motorsport racing event, and the recommendation includes a warning.

In some embodiments, the system and method further contain an emergency services module in communication with the decision-making module, wherein the emergency services module is configured to contact emergency service providers in response to an accident. The motorsport racing event is paused, and information associated with an audio feed and a video feed of the participant race vehicle is provided to emergency service providers.

An object of the system and method, in accordance with the present disclosure, is to mitigate human error in making the penalty-associated decisions during a motorsport racing event.

DETAILED DESCRIPTION

The present disclosure is a system and method for regulating or managing a motorsport racing event. Embodiments of the system and method are used for autonomous motorsport racing events. In other embodiments, the focus is human-controlled motorsport racing events. Regulated and managed events may also include a mix of human and AI participants. Motorsport racing events are fast-paced events that require near-instant decisions for penalties and warnings if a rule of the motorsport racing event is breached by a participant race vehicle. Typically, these decisions are made by human judges and are thus prone to human error.

Figure 1:
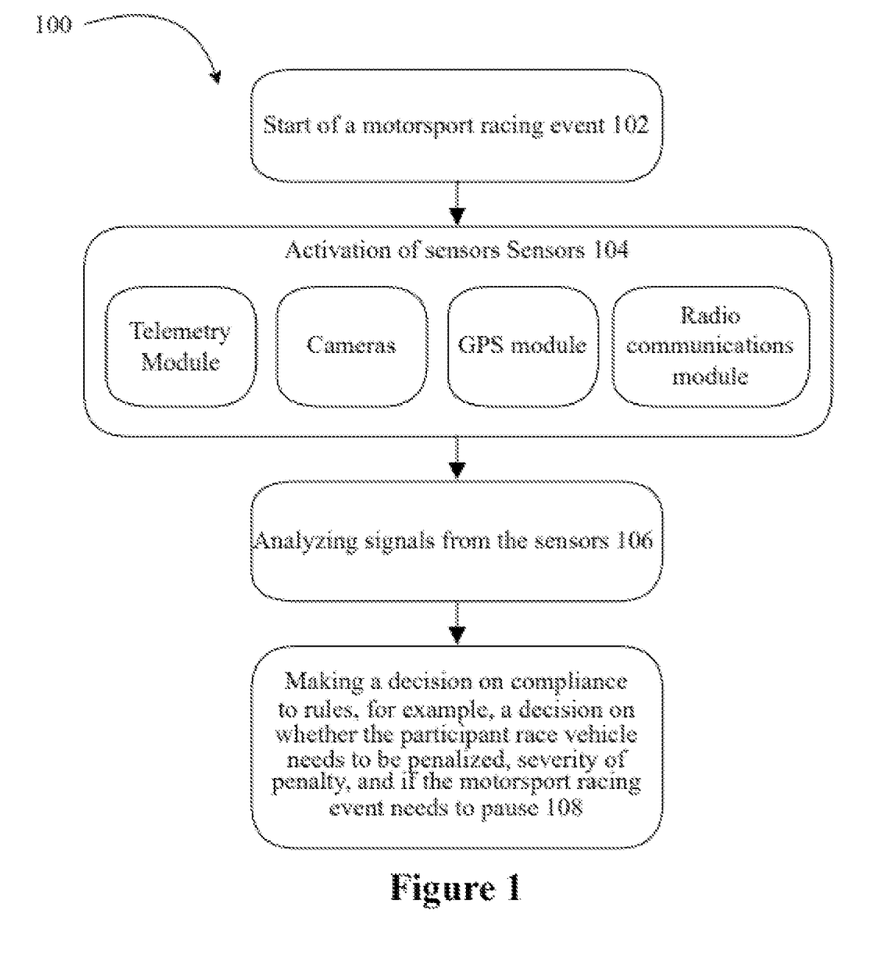
FIG. 1 shows a block diagram of a schema for regulating a motorsport racing event using present invention, in accordance with an embodiment of the present disclosure.

FIG. 1 shows a block diagram of a schema for regulating a motorsport racing event 100 (hereinafter referred to as schema 100) managed by current invention, in accordance with an embodiment of the present disclosure. At block 102, schema 100 the motorsport racing event starts.

At block 104, the schema 100 includes activation of sensors for sensing different parameters of participant race vehicles after the start of the motorsport racing event. In one embodiment, the sensors include a telemetry module, one or more cameras, a GPS module, and a radio communication module. In alternative embodiments, the telemetry module aids in real-time information transmission from a participant race vehicle for further analysis. In some embodiments, the one or more cameras capture video feeds of the participant race vehicle from different perspectives. The video feeds include video feeds from an interior of the participant race vehicle as well as an exterior surrounding area of the participant race vehicle, together or separately. In some embodiments, the GPS module includes information associated with a racetrack on which the motorsport racing event is being conducted. The GPS module also facilitates the tracking of the participant race vehicle on the racetrack. In some embodiments, the radio communication module facilitates communication between team members associated with the participant race vehicle. An audio feed of the radio communications between the team members of the participant race vehicle is also captured by the radio communication module for further analysis.

At block 106, the schema 100 includes analyzing signals from the sensors corresponding to a specific instance during a course of the motorsport racing event for checking if a certain action of the participant race vehicle has breached any rules of the motorsport racing event.

At block 108, the schema 100 includes making a decision on participant race vehicle's compliance to competition rules. An example is a decision about whether a participant race vehicle needs to be penalized, the severity of penalty, and if the motorsport racing event needs to pause. The decision is computed using artificial intelligence modules of different types. These types include expert modules and machine learning modules. Signals from the sensors are analyzed automatically for arriving at a decision regarding the penalty.

Figure 2:
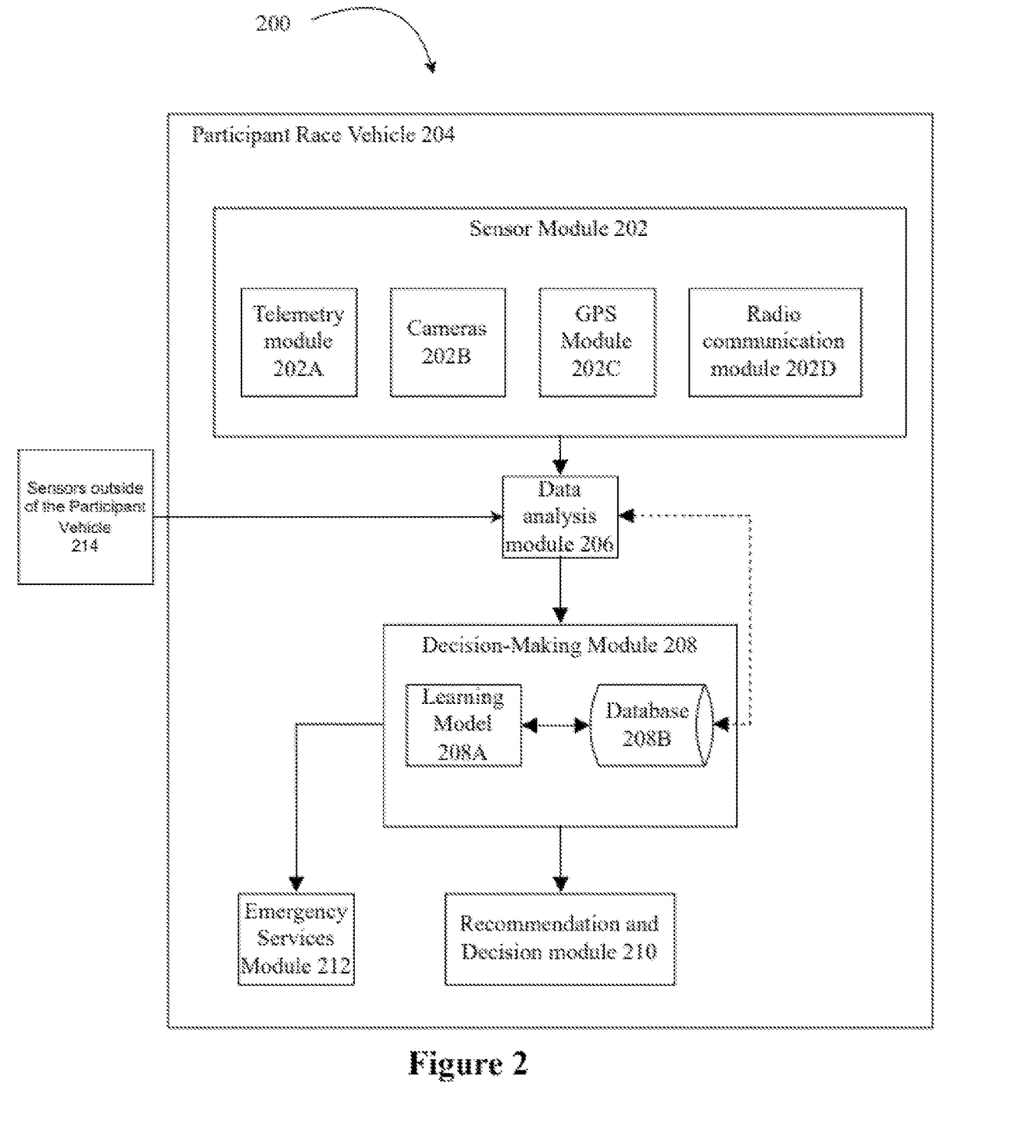
FIG. 2 shows a block diagram of a system for regulating a motorsport racing event, in accordance with an embodiment of the present disclosure that utilizes a learning module.

FIG. 2 shows a block diagram of a system for regulating a motorsport racing event 200 (hereinafter referred to as system 200), in accordance with an embodiment of the present disclosure. The system 200 comprises a sensor module 202 comprising a plurality of sensors 202A-202D. The sensor module 202 is configured onboard a participant race vehicle 204 for sensing a plurality of vehicle parameters during the motorsport racing event. The sensor module 202 generates a plurality of input signals, wherein each of the plurality of the input signal corresponds to at least one of the plurality of vehicle parameters. In one embodiment, the sensor module 202 may include a telemetry module 202A, one or more cameras 202B, a GPS module 202C, and a radio communication module 202D. In some embodiments, the telemetry module 202A aids in real-time information transmission from the participant race vehicle 204 for further analysis. In some embodiments, the one or more cameras 202B aid in capturing video feeds of the participant race vehicle 204 from different perspectives. The video feeds includes video feeds from an interior of the participant race vehicle 204 as well as an exterior surrounding area of the participant race vehicle 204. In some embodiments, the GPS module 202C includes information associated with a racetrack on which the motorsport racing event is being conducted. The GPS module 204 also facilitates the tracking of the participant race vehicle 204 on the racetrack. In some embodiments, the radio communication module 202D facilitates communication between team members associated with the participant race vehicle 204. An audio feed of the radio communications between the team members of the participant race vehicle is also captured by the radio communication module 202D for further analysis. In other embodiments, the sensor module 202 include static or mobile sensors installed on the racetrack, such as cameras and microphones. These static or mobile sensors may be used alternatively or in combination with vehicle-based sensors. Inputs from the various sensors comprise input signals, as will be explained further in connection with FIG. 2.

The system 200 further comprises a data analysis module 206 in communication with the sensor module 202 and sensors outside of the participating vehicle 214 to receive the plurality of input signals. The plurality of input signals, in accordance with one embodiment, may include video feeds from the one or more cameras 202B, audio feeds from the radio communications module 202D, and geolocation information from the GPS module 202C. The data analysis module 206 is configured to analyze each of the plurality of input signals to identify at least one instance related to at least one vehicle parameter to determine rule violation by the participant race vehicle and to generate an analyzed signal. In one implementation, the input signals corresponding to an incident of interest may be analyzed by the data analysis module 206. For example, in the case of a participant race vehicle driving off-road during a turn, the data analysis module 206 analyzes video feeds and geolocation data for detecting a violation. Further, the data analysis module 206 may also analyze video feed and audio feed of communications between team members of the participant race vehicle to detect if any rule was breached during the event of the vehicle driving off-road during the turn.

In another implementation, input signals from the plurality of sensors 202A-202D of the sensor module 202 are continuously monitored for all the participant race vehicles 204 in real-time to automatically detect any instance of rule violation by any of the participant race vehicles.

The system 200 further comprises a decision-making module 208. The decision-making module 208 communicates with data analysis module 206 to receive the analyzed signal. The decision-making module 208 is configured to compute a level of violation in response to a determination of a rule violation and compute a recommendation or a decision corresponding to the level of the rule violation. The analyzed signals generally include the information associated with the rule violation. More specifically, the analyzed signal includes the information if a rule violation has taken place by the participant race vehicle. The analyzed signals do not include information about a level of violation associated with the rule violation. For example, in the case of a participant race vehicle going off-road during a sharp turn, the off-road deviation may either be 10 mm or 1 m. In this example, the analyzed signal, therefore, includes information that the participant race vehicle has gone off-track during a sharp turn, and that the deviation was 10 mm or 1 m. In this example, the decision-making module 208 receives this information from the analyzed signal about the deviation being 10 mm, in response to which the decision-making module 208 computes that the violation is a low-level rule violation, whereas the deviation of 1 m may be computed as a high-level violation by the decision-making module 208.

In accordance with some embodiments, the decision-making module 208 includes a learning module 208A and a database 208B. The learning module 208A is configured to receive the analyzed signals. The database 208B is coupled to the learning module 208A, wherein the database 208B includes a set of rules associated with the motorsport racing event, in accordance with which the learning module 208A computes the decision or the recommendation. In some embodiments, the decision includes a penalty and a pause in the motorsport racing event, and the recommendation includes a warning. In one embodiment, the penalty may include removal of official credit of penalty laps, removal or addition of a specified amount of time to a competitor participant race vehicle, repositioning of competitor participant race vehicle during on-track activities, repositioning of an entrant participant race vehicle on the starting grid, and disqualification.

In one embodiment, the learning module 208A includes expert AI rules created based on heuristic data. In another embodiment, the learning module 208A includes the use of neural networks or other mechanisms capable of learning. In one embodiment, the teaching of the learning module 208A may be performed using data about previously audited and approved decisions of judges. For example, determination of severity of the penalty for a particular violation. An example of such a penalty is adding time to the total result, which in some sports ranges from 5 to 30 seconds. In another embodiment, the database 208B is a machine learning database that includes the set of rules for the motorsport racing event as well as information about previously audited and approved decisions of judges. Furthermore, the database 208 keeps on updating by the learning module 208A. More specifically, the pause in the motorsport racing event may be performed in case of accidents.

The system 200 further includes a penalty and recommendation module 210 that is in communication with the decision-making module 208 to receive information associated with the recommendation or the decision and present the recommendation or the decision. In some embodiments, the plurality of input signals, the analyzed signals, the recommendation, and the decision are generated in real-time.

In some embodiments, the system 200 further includes an emergency-services module 212 in communication with the decision-making module 208. The emergency-services module 212 is configured to contact emergency service providers in response to an accident and to pause the motorsport racing event. The emergency-services module 212 is further configured to provide information associated with an audio feed and a video feed of the participant race vehicle to the emergency service providers. The audio and video feed assists the emergency service providers to decide the next course of action.

Figure 3:
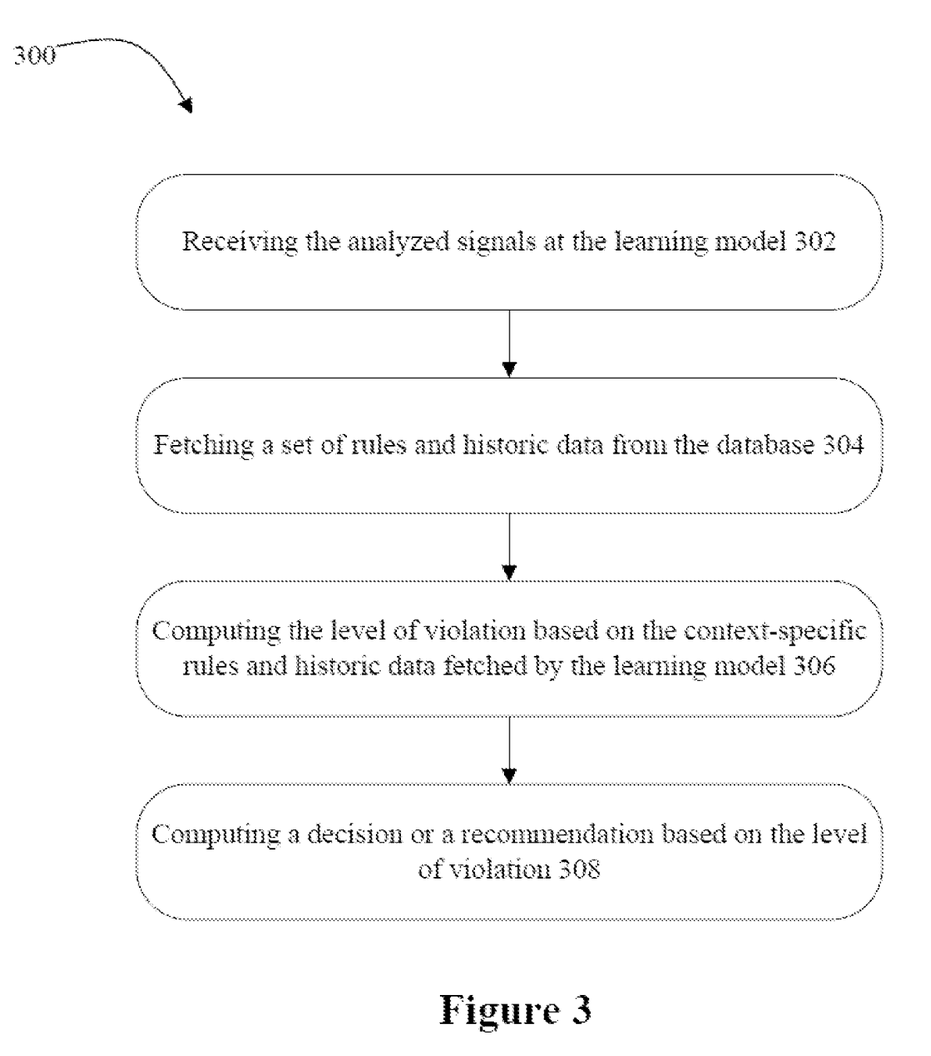
FIG. 3 shows a block diagram depicting an operation of a decision-making module used in the system of FIG. 2.

FIG. 3 shows a block diagram depicting an operation 300 of a decision-making module 208. At block 302, the operation 300 comprises receiving the analyzed signals at the learning module 208A of the decision-making module 208. The analyzed signals are generated by the data analysis module 206 subsequent to the analysis of the plurality of input signals from the sensor module 202.

At block 304, the operation 300 comprises fetching a set of rules and historic data from the database 208B, wherein the set of rules and historic data are specific to a context of rule violation. More specifically, the learning module 208A only fetches those rules and historic data similar to the context of rule violation. For example, if the rule violation relates to performing a disallowed maneuver consisting of bypassing another vehicle, then the learning module 208A only fetches the associated rules from the set of rules and similar historic data to make a computation of the level of violation.

At block 306, the operation 300 includes computing the level of violation based on the context-specific rules and historic data fetched by the learning module in the previous step. At this step, the learning module 208A compares the analyzed signal to the historic data and the set of rules to assess the level of violation.

At block 308, the operation 300 includes computing a decision or a recommendation based on the level of violation. In one implementation, the learning module uses historic data and the set of rules to compute the decision. In one implementation, the historic data includes previous decisions given by judges in similar context.

Figure 4:
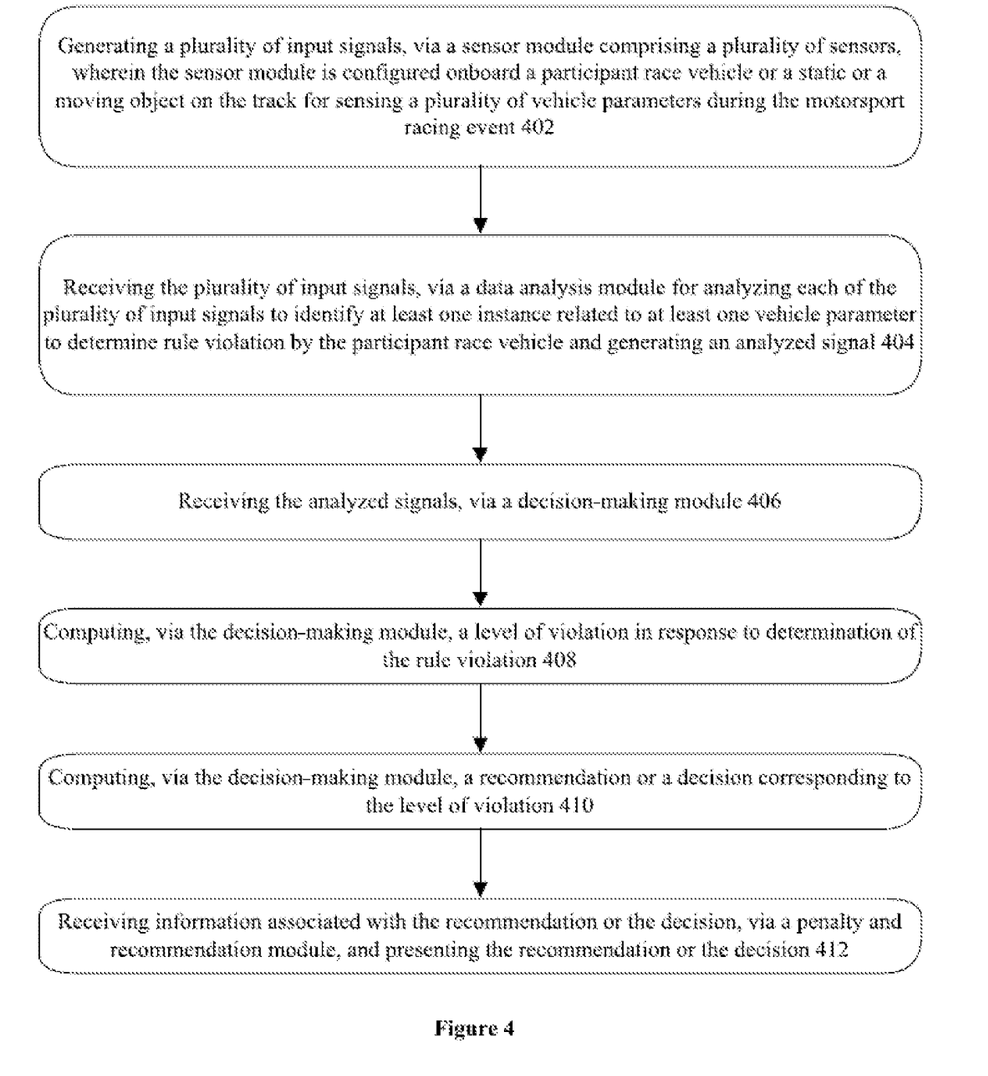
FIG. 4 shows a block diagram of a method for regulating a motorsport racing event, in accordance with an embodiment of the present disclosure.

FIG. 4 shows a block diagram of a method for regulating a motorsport racing event 400 (hereinafter referred to as method 400), in accordance with an embodiment of the present disclosure. The order in which the method 400 is described is not intended to be construed as a limitation, and any number of the described method blocks can be combined in any order to implement the method or similar alternative methods. Additionally, individual blocks can be deleted from the method without departing from the spirit and scope of the subject matter described herein. Furthermore, the method can be implemented in any suitable hardware, software, firmware, or combination thereof.

At block 402, the method 400 includes generating a plurality of input signals, by a sensor module 202 comprising a plurality of sensors 202A-202D, wherein the sensor module 202 is configured onboard a participant race vehicle for sensing a plurality of vehicle parameters during the motorsport racing event. In one embodiment, the sensor module 202 includes a telemetry module 202A, one or more cameras 202B, a GPS module 202C, and a radio communication module 202D. In some embodiments, the telemetry module 202A aids in real-time information transmission from the participant race vehicle 204 for further analysis. In some embodiments, the one or more cameras 202B aid in capturing video feeds of the participant race vehicle 204 from different perspectives. The video feeds include feeds from an interior of the participant race vehicle 204 as well as an exterior surrounding area of the participant race vehicle 204. In some embodiments, the GPS module 202C includes information associated with a racetrack on which the motorsport racing event is being conducted. The GPS module 204 also facilitates the tracking of the participant race vehicle 204 on the racetrack. In some embodiments, the radio communication module 202D facilitates communication between team members associated with the participant race vehicle 204. An audio feed of the radio communications between the team members of the participant race vehicle is also captured by the radio communication module 202D for further analysis. In some other embodiments, the sensor module 202 may also include static sensors such as cameras and microphones installed on the racetrack. In this context, the inputs from these sensors may be considered as a part of the plurality of input signals.

At block 404, the method 400 includes receiving the plurality of input signals, by a data analysis module 206 for analyzing each of the plurality of input signals to identify at least one instance related to at least one vehicle parameter to determine rule violation by the participant race vehicle and to generate an analyzed signal. In one implementation, the input signals corresponding to an incident of interest may be analyzed by the data analysis module 206. For example, in the case of a participant race vehicle driving off-road during a turn, the data analysis module 206 analyzes video feeds and geolocation data for detecting a violation. Further, the data analysis module 206 may also analyze video feed and audio feed of communications between team members of the participant race vehicle to detect if any rule was breached during the event of the vehicle driving off-road during the turn. In another implementation, input signals from the plurality of sensors 202A-202D of the sensor module 202 are continuously monitored for all the participant race vehicles 204 in real-time to automatically detect any instance of rule violation by any of the participant race vehicles.

At block 406, the method 400 includes receiving the analyzed signals, by a decision-making module 208. The analyzed signals include the information associated with the rule violation. More specifically, the analyzed signals include the information if a rule violation has taken place by the participant race vehicle. The analyzed signals do not include information about the level of violation associated with the rule violation.

At block 408, the method 400 includes computing, by the decision-making module 208, a level of violation in response to determination of the rule violation. In some embodiments, the decision-making module includes a learning module 208A to receive the analyzed signals. A database 208B is coupled to the learning module 208A, wherein the database includes a set of rules associated with the motorsport racing event, in accordance with which the learning module computes the decision or the recommendation. In some embodiments, computing the level of violation is based on the context-specific rules and historic data fetched by the learning module of the decision-making module 208 from a database containing the set of rules and historic data. At this step, the learning module 208A compares the analyzed signal to the historic data and the set of rules to assess the level of violation.

At block 410, the method 400 includes computing, by the decision-making module 208, a recommendation or a decision corresponding to the level of violation. In one embodiment, learning module 208A uses historic data and the set of rules to compute the decision. In another embodiment, the historic data includes previous decisions given by judges in similar context. In an embodiment, such decisions have been previously audited for correctness.

At block 412, the method 400 includes receiving information associated with the recommendation or the decision, by a penalty and recommendation module 210, and presenting the recommendation or the decision.

Some exemplary applications of the system 200 and method 400 are described in the subsequent sections of the present disclosure.

One exemplary application of the system 200 and method 400 is detection and processing of accidents on the racetrack. In such a scenario, input signals from sensor module 202 such as telemetry data from the telemetry module 202A, video feeds from one or more cameras 202B, and geolocation data from the GPS module 202C from the participant race vehicles involved in the accident are analyzed by the data analysis module 206. After analysis by the data analysis module 206, the analyzed signals are sent to the decision-making module 208, where the decision-making module 208 computes the decision to pause the motorsport racing event.

In some embodiments, the emergency services module 212 contacts the emergency service providing authorities, collects relevant audio and video feeds from the sensor module 202, and provides the audio and video feeds to the emergency service providing authorities to allow them to decide on the appropriate course of action to address the needs of those involved in the accident.

Another exemplary application of the system 200 and the method 400 is to train judges for motorsport racing events. Historical data from database 202B is used to compare the decisions of trainee judges in simulated conditions with past decisions under similar context for the purpose of educating the trainee judges. Furthermore, the decisions of the trainee judges are compared with the decision computed by the decision-making module for certain simulated conditions for the purpose of educating the trainee judges.

The system and method for regulating a motorsport racing event, in accordance with embodiments of the present disclosure, allow the elimination of human error in the computation of critical decisions and penalties during the motorsport racing events. An advantageous aspect of the system and method, in accordance with some embodiments of the present disclosure, is that the versatility of the system 200 allows the usage of the system 200 in autonomous as well as human-controlled motorsport racing events.

Another advantageous aspect of the system and method, in accordance with some embodiments of the present disclosure, is that the most critical decisions of the motorsport racing events are performed automatically and instantaneously by the use of the system 200. Another advantageous aspect of the system and method, in accordance with some embodiments of the present disclosure, is the obtainment of relevant decisions in a manner where the decisions are applied uniformly and objectively and are free from human errors in the form of bias or arriving at inaccurate decisions due to insufficiency of available time to make a decision because of the fast-paced nature of the sport or related.

Yet another advantageous aspect of the system 200, in accordance with some embodiments of the present disclosure, is that the system 200 can utilize all the existing sensors and hardware without the need of having to install new components. More specifically, additional sensors like proximity sensors are not required to be installed separately for the operation of the system 200. The system 200 can also be utilized in any of the existing motorsport events, where the predefined rules are fed to the database 208B for allowing the system 200 to make decisions about the penalties and so on.

Yet another advantage of the system 200 and method 400 is that they do not require (or include) an account for the driver or an account for the vehicle for storing and maintaining data associated therewith. As mentioned previously, one advantageous aspect of the system 200 and method 400 is that the system and method have the versatility to monitor one vehicle or a number of vehicles without any changes in the configuration of the system 200.

The invention claimed is:

1. A method for regulating a motorsport racing event using processing hardware, the method comprising:
generating a plurality of input signals, by a sensor module comprising instructions to execute on the processing hardware and a plurality of sensors, wherein the sensor module is configured onboard a participant race vehicle or on a static or a moving object on the racing track for sensing a plurality of vehicle parameters during the motorsport racing event;

receiving the plurality of input signals, by a data analysis module comprising instructions to execute on the processing hardware for analyzing each of the plurality of input signals to identify at least one instance related to at least one vehicle parameter to determine a rule violation by the participant race vehicle and generate an analyzed signal, wherein the rule violation includes at least one of: a participant race vehicle has gone off-track, a participant race vehicle has performed a disallowed maneuver, or unallowed radio communication associated with a participant race vehicle has been made;

receiving the analyzed signals, by a decision-making module comprising instructions to execute on the processing hardware;

computing, by the decision-making module, a level of violation in response to determination of the rule violation, wherein the level of violation includes at least two tiers of violation;

computing, by the decision-making module, a recommendation or a decision corresponding to the level of violation, wherein the recommendation or decision are associated with at least one of the at least two tiers of violation, and wherein the recommendation or decision is a computation of a penalty, computation of a recommendation or a decision to pause the motorsport racing event, or computation of a warning; and based on the recommendation or decision, at least one of:

contacting emergency service providers, by an emergency-services module in communication with the decision-making module, in response to an accident, and providing, by the emergency services module, information associated with an audio feed and a video feed of the participant race vehicle to the emergency service providers, pausing the motorsport racing event, issuing a warning to a participant race vehicle, or issuing a penalty to a participant race vehicle.

2. The method of claim 1 further comprising receiving information associated with the recommendation or the decision, by a penalty and recommendation module; and transmitting the recommendation or the decision.

3. The method of claim 1, wherein the plurality of input signals, the analyzed signals, the recommendation, and the decision are generated in real-time or with a predetermined delay.

4. The method of claim 1, wherein the decision-making includes:

receiving analyzed signals by a learning module; and using a database coupled to the learning module, wherein the database includes a set of rules associated with the motorsport racing event, in accordance with which the learning module computes the decision or the recommendation.

5. The method of claim 1, wherein receiving the plurality of input signals includes receiving a signal from a telemetry module, one or more cameras, a GPS module, or a radio communication module.

6. A system for regulating a motorsport racing event, the system comprising:

processor hardware and instructions to execute, on the processor hardware:

a sensor module comprising a plurality of sensors, wherein the sensor module is configured onboard a participant race vehicle or on a static or a moving object on the racing track for sensing a plurality of vehicle parameters during the motorsport racing event and to generate a plurality of input signals, wherein each of the plurality of the input signal corresponds to at least one of the plurality of vehicle parameters;

a data analysis module in communication with the sensor module to receive the plurality of input signals, the data analysis module configured to analyze each of the plurality of input signals to identify at least one instance related to at least one vehicle parameter to determine a rule violation by the participant race vehicle and to generate an analyzed signal, wherein the rule violation includes at least one of: a participant race vehicle has gone off-track, a participant race vehicle has performed a disallowed maneuver, or unallowed radio communication associated with a participant race vehicle has been made;

a decision-making module in communication with the data analysis module to receive the analyzed signal, wherein the decision-making module is configured to:

compute a level of violation in response to determination of rule violation, wherein the level of violation includes at least two tiers of violation; and compute a recommendation or a decision corresponding to the level of violation, wherein the recommendation or decision are associated with at least one of the at least two tiers of violation, and wherein the recommendation or decision is a computation of a penalty, computation of a recommendation or a decision to pause the motorsport racing event, or computation of a warning;

a penalty and recommendation module in communication with the decision-making module to receive information associated with the recommendation or the decision and present the recommendation or the decision, and a race services module in communication with the decision-making module and configured to, based on the recommendation or decision, at least one of:

contact emergency service providers, by an emergency-services module in communication with the decision-making module, in response to an accident, and providing, by the emergency services module, information associated with an audio feed and a video feed of the participant race vehicle to the emergency service providers, pause the motorsport racing event, issue a warning to a participant race vehicle, or issue a penalty to a participant race vehicle.

7. The system of claim 6, wherein the plurality of input signals, the analyzed signals, the recommendation, and the decision are generated in real-time or with a certain delay.

8. The system of claim 6, wherein the decision-making module includes:

a learning module to receive the analyzed signals; and a database coupled to the learning module, wherein the database includes a set of rules associated with the motorsport racing event, in accordance with which the learning module computes the decision or the recommendation.

9. The system of claim 6, wherein the sensor module includes a telemetry module, one or more cameras, a GPS module, and a radio communication module.

10. The method of claim 4, wherein the learning module only fetches rules from the database having a context similar to a context of the rule violation.

11. The system of claim 8, wherein the learning module only fetches rules from the database having a context similar to a context of the rule violation.

12. The method of claim 1, wherein the analyzed signals received by the decision-making module do not include the level of violation.

13. The method of claim 12, wherein the analyzed signals include a rule violation and a deviation value of the rule violation.

14. The system of claim 6, wherein the analyzed signals received by the decision-making module do not include the level of violation.

15. The system of claim 14, wherein the analyzed signals include a rule violation and a deviation value of the rule violation.

16. The method of claim 1, wherein receiving the plurality of input signals occurs continuously for the participant race vehicle and a plurality of other vehicles during the motorsport racing event.

\* \* \* \* \*